United States Patent [19]
Furukawa et al.

[11] Patent Number: 5,714,826
[45] Date of Patent: Feb. 3, 1998

[54] ELECTRIC MOTOR

[75] Inventors: Sumio Furukawa; Kunihiro Noto; Masaru Watanabe; Koji Nosaka, all of Yokohama, Japan

[73] Assignee: Jidosha Denki Kogyo Kabushiki Kaisha, Yokohama, Japan

[21] Appl. No.: 398,521

[22] Filed: Mar. 3, 1995

[30] Foreign Application Priority Data

Mar. 10, 1994 [JP] Japan .................. 6-040006

[51] Int. Cl.$^6$ .................................................. H02K 13/00
[52] U.S. Cl. ........................ 310/251; 310/239; 310/242
[58] Field of Search ............................. 310/239, 242, 310/248, 251

[56] References Cited

U.S. PATENT DOCUMENTS

| | | | |
|---|---|---|---|
| 2,474,601 | 6/1949 | Thomas | 310/239 |
| 2,615,939 | 10/1952 | Mitchell | 310/239 |
| 4,074,162 | 2/1978 | Parzych | 310/245 |
| 4,342,934 | 8/1982 | Van Wijhe et al. | 310/239 |
| 4,843,274 | 6/1989 | Paisley | 310/239 |
| 5,083,055 | 1/1992 | Hokanson | 310/248 |
| 5,198,712 | 3/1993 | Bolzan, Jr. et al. | 310/242 |
| 5,280,212 | 1/1994 | Oba | 310/248 |

FOREIGN PATENT DOCUMENTS 61-74266 of 1986 Japan .
62-51945 of 1987 Japan .

*Primary Examiner*—Steven L. Stephan
*Assistant Examiner*—Michael J. Wallace, Jr.
*Attorney, Agent, or Firm*—Sughrue, Mion, Zinn, Macpeak & Seas, PLLC

[57] ABSTRACT

An electric motor is provided with especially brushes of which rear ends are cut diagonally to form acute angles at the corner edges on the backward side of the rotating direction of the armature. The brushes are maintained securely in brush holders without vibration by first and second side walls of the brush holders according to component force of pressing force applied on the slant rear ends of the brushes by pressing members, therefore the objectionable noise caused by the "stick-slip" is prevented very effectively without introducing complicated structure in the motor.

2 Claims, 3 Drawing Sheets

5,714,826

1
ELECTRIC MOTOR

BACKGROUND OF THE INVENTION

1. Field of the Invention

This invention relates to an electric motor used for actuating, for example, a fun in an air conditioner for motor vehicles.

2. Description of the Prior Art

For example, a motor has been known as the motor for actuating the fun of the air conditioner for motor vehicles, which is provided with an armature housed rotatably in a motor yoke. The armature provided with an armature core and a commutator on an armature shaft, the commutator is connected electrically to an armature coil wounded around the armature core and an electric current is supplied to the armature coil through a pair of brushes in contact with the commutator. A holder base is disposed in the vicinity of the commutator and fixed with a pair of brush holders thereon for retaining the brushes. Each of the brushes is housed in the brush holder with some clearance movably in the radial direction of the commutator and engaged with a brush spring at the rear end in the brush holder so as to be pressed against the commutator at the front end according to elasticity of the brush spring.

By closing an external power circuit connected to the brushes, an electric current flows in the armature coil through the brush and the commutator and the armature rotate, thereby actuating the fun secured to the armature shaft.

However, in the aforementioned conventional electric motor, rotatory power generated by the motor is not always constant theoritically but fluctuates always pulsatingly, further the coefficient of friction between the commutator and the brushes is not always constant but also fluctuates pulsatingly all the time according to the change in the condition of the commutator surface caused by a commutation spark and so on. Accordingly, a contact part of the brush with the commutator moves periodically in the same direction of the rotation of the commutator, and the brush moves violently in the brush holder, whereby the so-called stick-slip is caused between the commutator and the brush. Accordingly, there is a problem since there is the possibility that a frictional noise may be produced from the motor of this kind.

SUMMARY OF THE INVENTION

Therefore,this invention is made in view of the above mentioned problem of the prior art, and it is-an object to provide an electric motor which is possible to prevent the objectionable noise caused by the "stick-slip" without introducing complicated structure.

The construction of the electric motor according to this invention in order to accomplish the above-mentioned object is characterized by comprising a motor yoke; an armature housed rotatably in the motor yoke and provided with an armature shaft, an armature core and a commutator fixed on the armature shaft, and an armature coil wound around the armature core and connected with the commutator; a magnet disposed on an inner peripheral face of the motor yoke at a position facing to the armature core; a holder base disposed on an inner side of the motor yoke at a position close to the commutator of the armature; a pair of brush holders, each of the brush holders being disposed on the holder base so as to form a predetermined trailing angle against a radial direction of the commutator, and having a first side wall and a second side wall on a backward side and a forward side of the rotating direction of the armature respectively; a pair of brushes, each of brushes being housed in one of the brush holders through a predetermined clearance between the first and second side walls of the brush holder movably toward the commutator and connected to an external circuit; and a pair of pressing members disposed to the respective brush holders for pressing front end faces of the respective brushes against the commutator of the armature by thrusting rear ends of the respective brushes; wherein each of the rear ends of the respective brushes is obliquely cut at a predetermined angle so as to form an acute angle at a corner edge of each of the brushes on the backward side of the rotating direction of the armature, and each of the brush is in contact with the first side wall of the brush holder at the acute-angled corner edge and held by a front end of the second side wall of the brush holder on a side of the commutator.

Furthermore, in the electric motor according to this invention, it is desirable to form the acute-angled corner edge of each of the brushes at an angle of 60 to 85 deg, further preferably of 70 to 80 deg, and it is also desirable to select a trailing angle of each of the brush holders at an angle of 5 to 25 deg, further preferably of 12 to 15 deg.

In the electric motor according to this invention, the brush is cut diagonally at the rear end thereof, and the corner edge of the brush on the backward side is formed at an acute angle of, for example, 60 to 85 deg. Therefore, the acute-angled corner edge of the brush is pressed against the first side wall of the brush holder according to a component of a pressing force applied on the obliquely cut rear end face of the brush by the pressing member, and the brush is securely maintained by the first and the second side walls of the brush holder at the acute-angled corner edge and a point contacting with the front end of the second side wall.

Accordingly, the brush is prevented from the vibration and the "stick-slip" between the brush and the commutator is solved, whereby the objectionable frictional noise disappears.

DESCRIPTION OF THE PREFERRED EMBODIMENT

An embodiment of the electric motor according to this invention will be described below on basis of FIG. 1 to FIG. 3.

Figure 1:
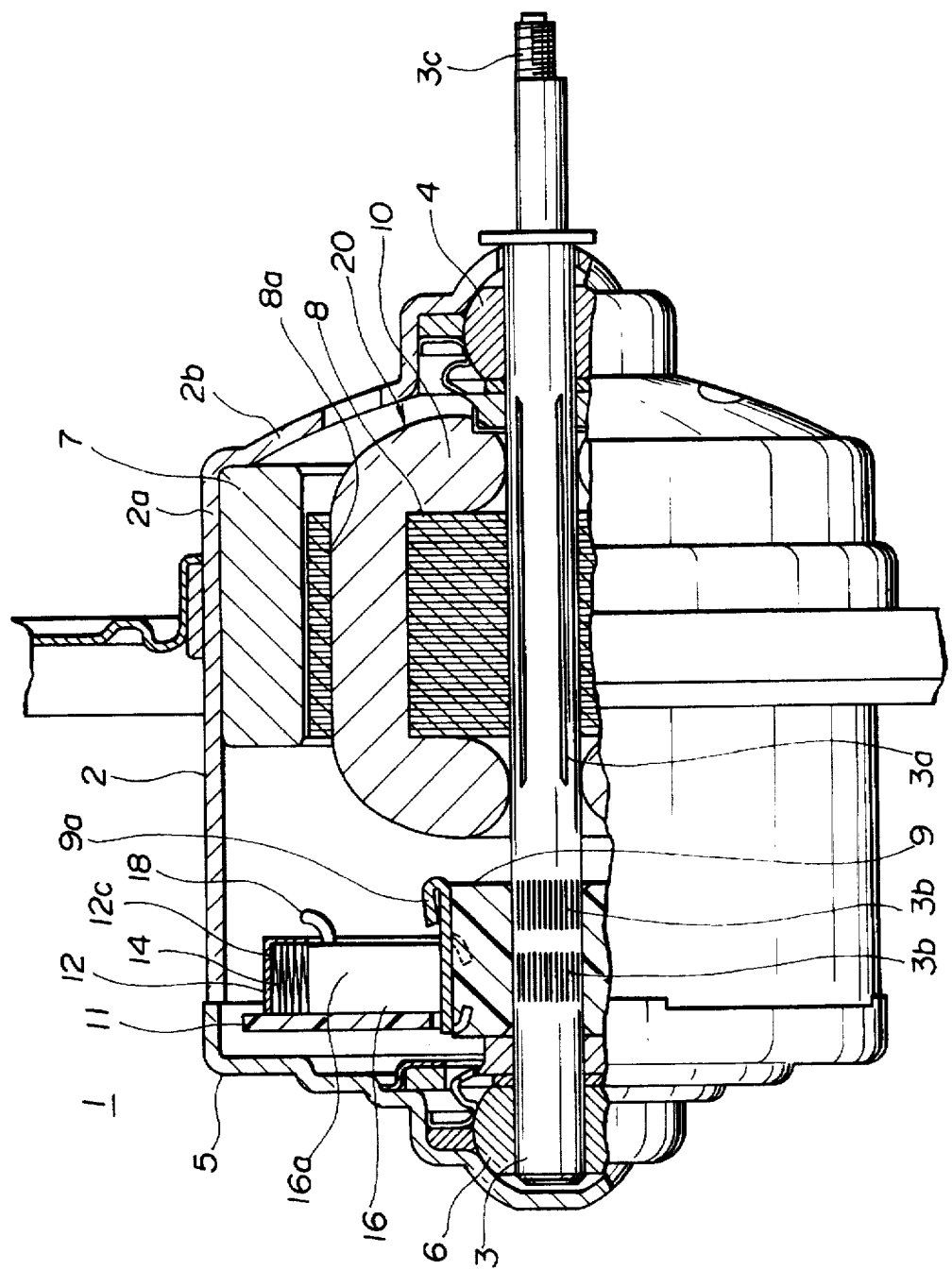
FIG. 1 is a partially sectional side view illustrating an embodiment of an electric motor according to this invention.

In an electric motor 1 shown in FIG. 1, an armature 20 with an armature shaft 3 is housed in a motor yoke 2, and the motor yoke 2 consists of a yoke body part 2a formed in a hollow cylindrical shape and a top part 2b formed continuously from the yoke body part 2a in one body.

The motor yoke 2 is attached with an end cover 5 for covering an open end thereof and fitted with bearings 4 and 6 at the center of the top part 2a and the center of the end cover 5 on the inner side thereof. The motor yoke 2 houses the armature 20 of which armature shaft 3 is supported by the bearings 4 and 6 rotatably. Furthermore, the motor yoke 2 is disposed with a magnet 7 formed in a half cylindrical shape on the inner peripheral face of the yoke body part 2a. An end 3c of the armature shaft 3 extruding from the top part 2b of the motor yoke 2 is connected with, for example, a fun and so.

The armature 20 is secured with an armature core 8 formed by putting several sheets of thin steel plates in layers at the middle position of the armature shaft 3 and fixed with a commutator 9 on the armature shaft at the position near to the armature core 8. The armature core 8 is secured on the armature shaft 3 by press-fitting it onto a projection part 3a formed with four linear projections around the armature shaft 3 in the longitudinal direction, and the commutator 9 is also secured on the armature shaft 3 by press-fitting it onto a knurled part 3b applied knurling around the armature shaft 3. The commutator 9 is disposed with a plurality of commutator pieces 9a corresponding to the number of slots of the armature core 8 on the outer periphery thereof, and an armature coil 10 is formed by enameled wires wound around winding parts 8a corresponding to the number of the slots of the armature core 8 and connected to the respective commutator pieces 9a.

The respective commutator pieces 9a of the commutator 9 is made from copper alloy containing silver (Ag) of 0.02 to 0.04%, and the commutator 9 is formed with an error of roundness of not more than 2.5 μm. Additionally, in the electric motor 1 according to this embodiment, the armature 20 is so designed as to rotate in the anticlockwise direction together with the commutator 9 as shown in FIG. 2 and FIG. 3. Furthermore, it is not always necessary to use the commutator pieces 9a containing silver (Ag).

The electric motor 1 is disposed with a discshaped holder base 11 made from synthetic resin at a position close to the commutator 9 on the inner side of the motor yoke 2, and the holder base 11 is disposed with two brush holder 12 and 13 at positions opposed with each other.

An explanation will be given mainly concerning the brush holder 12 as the brush holders 12 and 13 have the same construction. As shown in FIG. 3, the brush holder 12 has a first side wall 12a on the backward side of the rotating direction of the commutator 9 (armature 20), a second side wall 12b on the forward side of the rotating direction of the commutator 9 and an end wall 12c between the first and the second side walls 12a and 12b, and is formed with a brush containing space 12d by the first side wall 12a, the second side wall 12b and the end wall 12c. The brush holder 12 is disposed on the holder base 11 so as to form a predetermined trailing angle α of 5 to 25 deg between the center lime m of the brush holder 12 and a straight line n connecting the center O of the commutator 9 and a point Q where the center line m of the brush holder 12 meets with the outer periphery of the commutator 9. An area of the contact surface between a brush 16 (described later) and the commutator 9 becomes wider by setting the trailing angle α into 5 to 25 deg as compared with a case of not setting the trailing angle. The trailing angle α is further preferable to be selected at angle of 12 to 15 deg.

The internal width L between the first and the second side walls 12a and 12b of the brush holder 12 is set in a value obtained by adding predetermined clearance G to the width W of the brush 16 described later. It is preferable to determine the clearance G in a range of 0.05 to 0.30 mm.

The other brush holder 13 is also provided similarly to the above-mentioned brush holder 12, with a first side wall 13a on the backward side of the rotating direction of the commutator 9, a second side wall 13b on the forward side of the rotation, an end wall 13c between the first and the second side walls 13a and 13b, and a brush containing space 13d surrounded with the first side wall 13a, the second side wall 13b and the end wall 13c, furthermore the internal width between the first and the second side walls 13a and 13b is set in consideration of the predetermined clearance and the width of a brush 17 described later. The brush holder 13 is also forms the same trailing angle α similarly to the case of the brush holder 12.

The brush holders 12 and 13 are housed with pressing members 14 and 15 in the bottom of the respective brush containing spaces 12d and 13d thereof.

The pressing members 14 and 15 are helical springs having the same shapes and the same sizes, and formed respectively in the outside diameter slightly smaller than the width between the first and the second side walls 12a (13a) and 12b (13b).

The respective pressing members 14 and 15 have free length and elasticity sufficient to press the brushes 16 and 17 against the commutator 9 with predetermined pressure of 100 to 1000 gf/cm$^2$, for example. The respective ends of the pressing member 14 and 15 are engaged with the end walls 12c and 13c in the brush containing spaces 12d and 13d of the brush holders 12 and 13. As the pressing member 14 or 15, it is not only limited to the helical spring so far as it is possible to press the brush 16 or 17 against the commutator 9 at the predetermined force.

The brush holder 12 is housed with the brush 16 together with the pressing member 14 in the brush containing space 12d so that the brush 16 may be pressed on the commutator 9 by the elasticity of the pressing member 14, and similarly the brush holder 13 is housed with the brush 17 together with the pressing member 15 in the brush containing space 13d so that the brush 17 may be pressed on the commutator 9 by the elasticity of the pressing member 15.

The brushes 16 and 17 are formed from electrographite containing copper (Cu) of 30 to 50% and have the same sizes, accordingly an explanation will be given below chiefly concerning the brush 16. The brush 16 is formed in a rectangular column-like shape with a forward side face 16a facing to the second side wall 12b of the brush holder 12 on the forward side of the rotating direction of the commutator 9 and a backward side face 16b facing to the first side wall 12a of the brush holder 12 on the backward side of the rotating direction. The pressing member 14 is in contact with a rear end 16c in the compressive state, so that the brush 16 is held by the brush holder 12 movably toward the commutator 9 and pressed on the commutator piece 9a of the commutator 9 at a front end 16d thereof. The brush 16 is connected with a pigtail 18, which is to be connected with an external power circuit (not shown) through a terminal 21.

Figure 3:
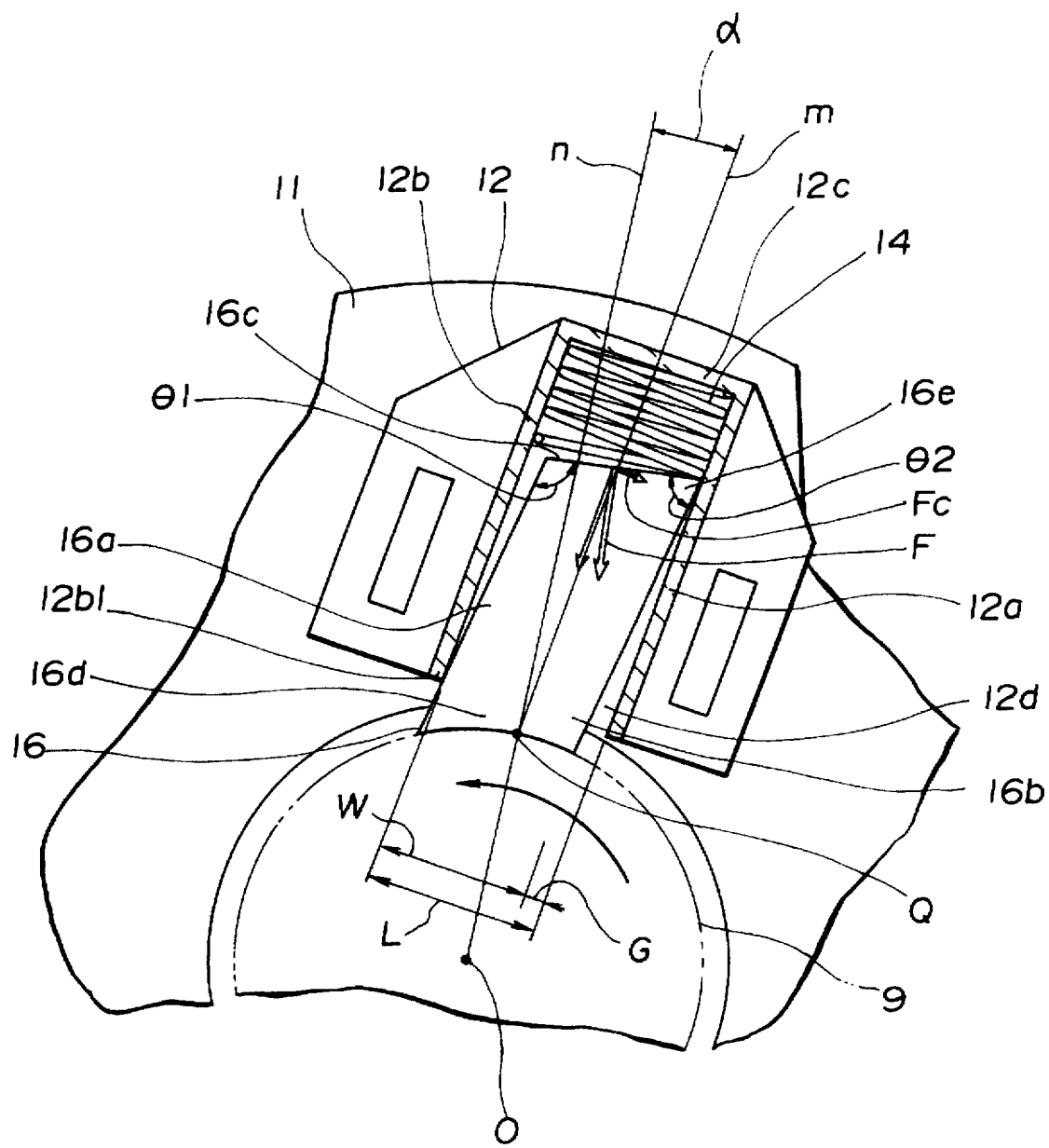
FIGS. 3 is a partially sectional front view illustrating relative location of the brush holder, the brush and the pressing member in the electric motor shown in FIG. 1.

The rear end 16c of the brush 16 is cut diagonally at a predetermined angle as shown in FIG. 3 to make a forward vertical angle θ1 formed at a corner edge on the forward side of the rotating direction of the commutator 9 (that is, the forward vertical angle θ1 is made between the forward side face 16a and a face of the rear end 16c of the brush 16) into an obtuse angle, and to make a backward vertical angle θ2 formed at a corner edge 16e on the backward side of the rotating direction of the commutator 9 (that is, the backward vertical angle θ2 is made between the backward side face 16b and the face of the rear end 16c of the brush 16) into an acute angle.

Namely, because the brush 16 has a diagonally cut rear end 16c and is housed in the brush holder 12 with the predetermined clearance G as mentioned above, a component force Fc is produced according to the elastic force F applied on the face of rear end 16c by pressing member 14 to give the brush 16 with clockwise rotation in FIG. 3, whereby the brush 16 comes in touch with the first side wall 12a of the brush holder 12 at the acute-angled corner edge 16e and held by a front end 12b1 of the second side wall 12b of the brush holder 12. The backward vertical angle θ2 of the corner edge 16e on the backward side of the rotation of the commutator 9 is desirable to be formed at an angle of 60 to 85 deg and further preferable to be formed at an angle of 70 to 80 deg. Accordingly the forward vertical angle θ1 on the forward side of the rotation is desirable to be 95 to 120 deg, further to be 100 to 110 deg.

The brush 17 has a forward side face 17a facing to the second side wall 13b of the brush holder 13 and a backward side face 17b facing to the first side wall 13a of the brush holder 13, and is held by the brush holder 13 movably toward the commutator 9 according to the compressed pressing member 15 in contact with a rear end 17c so as to be pressed on the commutator piece 9a of the commutator 9 at a front end 17d thereof similarly to the brush 16. The brush 17 is also connected with the external power circuit through a pigtail 19 and a terminal 22.

The rear end 17c of the brush 17 is also cut diagonally at the predetermined angle to form a forward vertical angle θ1 with an obtuse angle at a corner edge on the forward side of the rotation of the commutator 9 and to form a backward vertical angle θ2 with an acute angle at a corner edge 17e on the backward side of the rotation. Therefore the brush 17 comes in touch with the first side wall 13a of the brush holder 13 at the acute-angled corner edge 17e and held by a front end 13b1 of the second side wall 13b of the brush holder 13 according to the component force Fc of the elastic force F generated by the pressing member 15 similarly to the case of the brush 16.

Figure 2:
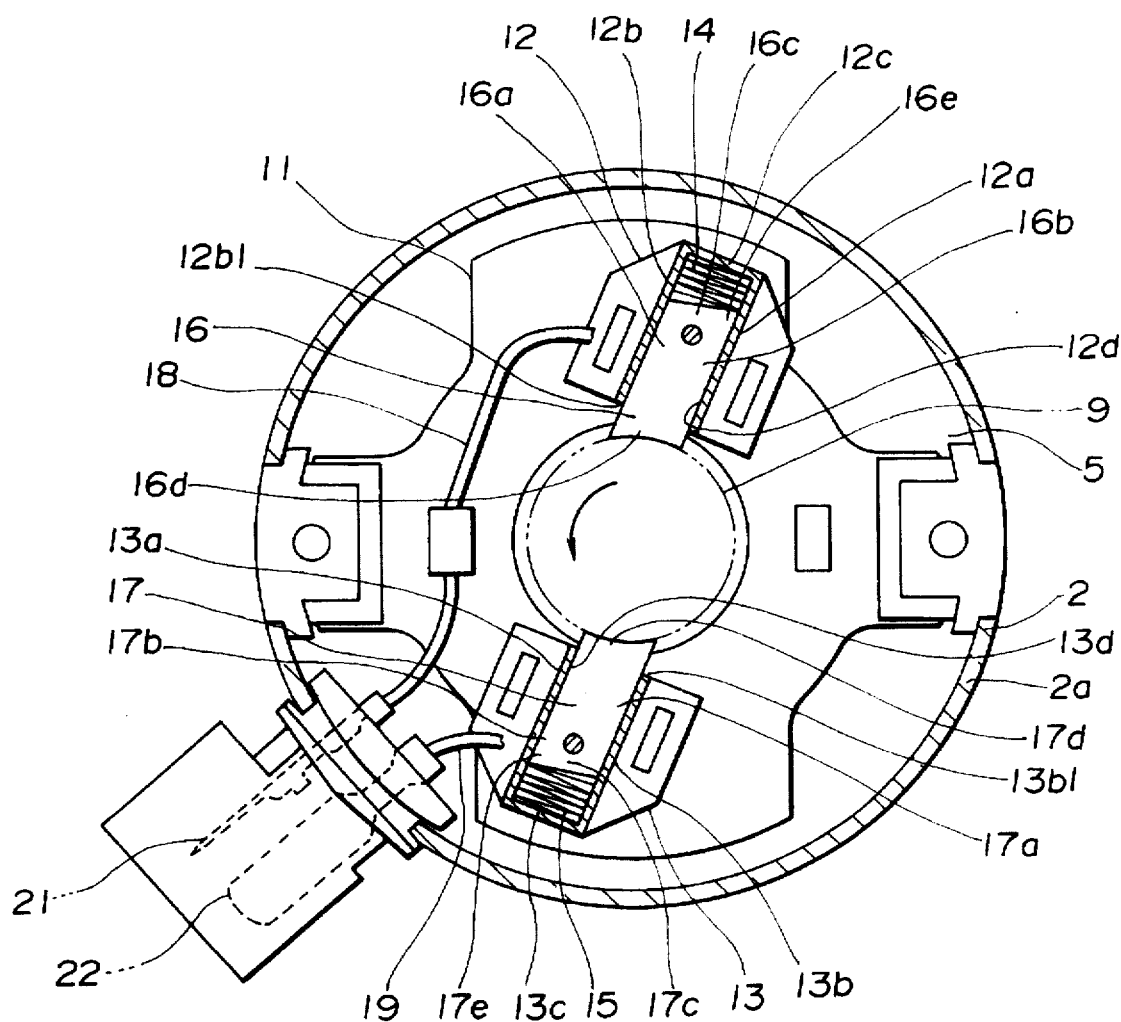
FIG. 2 is a partially sectional front view illustrating arrangement of brushes of the electric motor shown in FIG. 1.

In the electric motor 1, by closing the external power circuit connected to the terminals 21 and 22, an electric current flows to the armature coil 10 of the armature 20 through the pigtails 18, 19, the brushes 16, 17 and the commutator 9, whereby the armature 20 rotates together with the commutator 9 in the anticlockwise direction as shown in FIG. 2 and FIG. 3, and the brushes 16 and 17 supply the electric current to the armature coil 10 as touching with the commutator pieces 9a of the commutator successively.

In this time, the brushes 16 and 17 are pressed against the commutator pieces 9a of the commutator 9 according to the elastic force F generated by the pressing members 14 and 15 respectively, and applied with the component force Fc of the elastic force F according to the diagonally cut faces of the rear ends 16c and 17c at the same time. Accordingly, the brushes 16 and 17 comes in touch with the first side walls 12a and 13a of the brush holders 12 and 13 at the acute-angled corner edges 16e and 17e, and in touch with the front ends 12b1 and 13b1 of the second side walls 12b and 13b of the brush holders 12 and 13, respectively, so that the brushes 16 and 17 are maintained firmly in the brush containing spaces 12d and 13d without vibrating by the first and the second side walls 12a, 12b and 13a, 13b of the brush holders 12 and 13 at the acute-angled corner edges 16e and 17e and the points touched with the front ends 12b1 and 13b1 of the second side walls 12b and 13b.

Therefore, the brushes 16 and 17 are prevented from the vibration and the "stick-slip", thereby preventing the frictional noise.

As mentioned above, in the electric motor according to this invention provided with especially brushes of which rear ends are cut obliquely so as to form acute angles at the corner edges on the backward side of the rotating direction of the armature, the brush are maintained firmly in the brush holders without vibrating or moving in the rotating direction of the commutator by the first and the second side walls of the brush holders according to the component force of the pressing force applied on the obliquely cut rear ends of the brushes from the pressing members. Accordingly, an excellent effect can be obtained in that it is possible to prevent the objectionable frictional noise caused by the "stick-slip" very effectively without any additional structure.

Although the explanation is given about the electric motor provided with two brushes disposed symmetrically with respect to the commutator in the above-mentioned embodiment, this invention also includes an electric motor provided with the third brush for high speed rotation in addition to the two brushes.

What is claimed is:

1. A brush assembly for a motor having a commutator rotatable about a first axis, the assembly comprising:

an elongated brush holder having a closed end, and open end, a center line disposed at a predetermined trailing angle relative to a radius of said commutator and first and second side walls disposed on opposite sides of said center line in a backward and forward direction respectively relative to a direction of rotation of said commutator;

a brush movably disposed in said brush holder for movement toward said commutator with a predetermined clearance relative to said first and second side walls of said brush holder, said brush having a front end face, a rear end face, a forward side face facing said second side of said brush holder and a rearward side face facing said first side wall of said brush holder; and pressing means disposed in said brush holder in engagement with said closed end of said holder and said rear end face of said brush for pressing said front end face of said brush against said commutator;

wherein said rear end face of said brush is disposed at an acute angle relative to said rearward side face of said brush to define a rearward corner edge disposed in engagement with said first side wall of said brush holder and wherein said front side face of said brush engages said second side wall of said brush holder at said open end of said brush holder.

2. An electric motor comprising:

a motor yoke;

an armature rotatably mounted in said motor yoke and comprising an armature shaft, an armature core and a commutator fixed on said armature shaft and an armature coil wound around said armature core and connected with said commutator;

a magnet disposed on an inner peripheral surface of said motor yoke at a position facing said armature core;

a holder base mounted in said motor yoke adjacent said commutator; and a pair of brush assemblies for supplying electrical power to said coil through said commutator, each brush assembly comprising:

a brush movably disposed in said brush holder for movement toward said commutator with a predetermined clearance relative to said first and second side walls of said brush holder, said brush having a front end face, a rear end face, a forward side face facing said second side wall of said brush holder and a rearward side face facing said first side wall of said brush holder; and pressing means disposed in said brush holder in engagement with said closed end of said holder and said rear end face of said brush for pressing said front end face of said brush against said commutator;

wherein said rear end face of said brush is disposed at an acute angle relative to said rearward side face of said brush to define a rearward corner edge disposed in engagement with said first side wall of said brush holder and wherein said front side face of said brush engages said second side wall of said brush holder at said open end of said brush holder.

* * * * *